(12) United States Patent
Abbasi et al.

(10) Patent No.: US 11,255,575 B2
(45) Date of Patent: Feb. 22, 2022

(54) PROCESS AND SYSTEM FOR HOT AND/OR COLD ENERGY TRANSFER, TRANSPORT AND/OR STORAGE

(71) Applicant: GAS TECHNOLOGY INSTITUTE, Des Plaines, IL (US)

(72) Inventors: Hamid Abbasi, Naperville, IL (US); David Cygan, Villa Park, IL (US); S. B. Reddy Karri, Naperville, IL (US); John Findlay, Homer Glen, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 471 days.

(21) Appl. No.: 15/463,333

(22) Filed: Mar. 20, 2017

(65) Prior Publication Data
US 2018/0266728 A1 Sep. 20, 2018

(51) Int. Cl.
*F24S 60/00* (2018.01)
*F28D 20/00* (2006.01)
(Continued)

(52) U.S. Cl.
CPC .............. *F24S 60/00* (2018.05); *F24S 80/20* (2018.05); *F28D 13/00* (2013.01); *F28D 20/0056* (2013.01); *F28D 20/023* (2013.01); *F28D 20/028* (2013.01); *F28D 2020/0021* (2013.01); *F28D 2020/0082* (2013.01); *Y02E 10/40* (2013.01); *Y02E 60/14* (2013.01)

(58) Field of Classification Search
CPC F24S 60/00; F24S 80/20; F28D 13/00; F28D 20/0056; F28D 20/023; F28D 20/028; F28D 2020/0021; F28D 2020/0082; Y02E 60/142; Y02E 60/145; Y02E 10/40; Y02E 60/14

USPC ......................................................... 126/617
See application file for complete search history.

(56) References Cited

U.S. PATENT DOCUMENTS

| 2,694,047 A | * | 11/1954 | Glazier | ...................... C10J 3/12 252/373 |
| 3,908,632 A | * | 9/1975 | Poulsen | .................. F24S 80/20 126/643 |

(Continued)

OTHER PUBLICATIONS

U.S. Patent Office, English language version of the International Search Report, Form PCT/ISA/210 for International Application PCT/US18/1580, dated Apr. 26, 2018 (2 pages).

(Continued)

*Primary Examiner* — Steven B McAllister
*Assistant Examiner* — Benjamin W Johnson
(74) *Attorney, Agent, or Firm* — Pauley Erickson & Swanson

(57) ABSTRACT

A thermal conveyance system and process for absorbing, transporting, storing, and recovering thermal energy (both hot and cold energy) over a wide range of temperatures from up to 2,100° F., or higher, or cool energy at subzero temperatures in inert and stable particles without the need to maintain a minimum temperature or requiring high system pressures. The process involving the transferring thermal energy to a first transfer fluid and recovering thermal energy from a second transfer fluid wherein the first and the second transfer fluids comprise a two phase thermal media including a gaseous carrier containing a quantity of micron to millimeter sized solid particles.

20 Claims, 2 Drawing Sheets

(51) Int. Cl.
*F24S 80/20* (2018.01)
*F28D 20/02* (2006.01)
*F28D 13/00* (2006.01)

(56) References Cited

U.S. PATENT DOCUMENTS

| | | | |
|---|---|---|---|
| 4,088,541 A | 5/1978 | Choi et al. | |
| 2007/0125463 A1 | 6/2007 | Kohasko et al. | |
| 2009/0277443 A1* | 11/2009 | Jukkola | F03G 6/065 |
| | | | 126/643 |
| 2010/0242353 A1* | 9/2010 | Jovanovic | B01J 19/0013 |
| | | | 44/639 |
| 2013/0257056 A1 | 10/2013 | Ma | |
| 2013/0284163 A1* | 10/2013 | Flamant | B01J 8/1809 |
| | | | 126/634 |
| 2015/0316328 A1 | 11/2015 | Trainham et al. | |
| 2016/0163943 A1 | 6/2016 | Cygan et al. | |

OTHER PUBLICATIONS

U.S. Patent Office, English language version of the Written Opinion of the International Searching Authority, Form PCT/ISA/237 for International Application PCT/US18/15820, dated Apr. 26, 2018 (5 pages).

Arlon J. Hunt, "Development of a New High Temperature Gas Receiver Utilizing Small Particles," Lawrence Berkeley Laboratory, University of California, Berkeley, California, Presented at the International Symposium on Solar Thermal Power and Energy Systems, Marseille, France, Jun. 15-20, 1980, (12 pages).

Hossein Afshar et al., Two-Phase Study of Fluid Flow and Heat Transfer in Gas-Solid Flows (Nanofluids), Applied Mechanics and Materials vols. 110-116, Trans Tech Publications, Switzerland, 2012, (6 pages).

SAIC Canada, Renewable Energy and Climate Change Program, "Compact Thermal Energy Storage Technology Assessment Report," Document Reference No. CM002478, Ottawa, Canada, May 2013 (46 pages).

SunShot U.S. Department of Energy, "Concentrating Solar Power Program Review 2013," Phoenix, Arizona, Apr. 2013, (136 pages).

Leonard Farbar et al., "Heat Transfer Effects to Gas-Solids Mixtures Using Solid Spherical Particles of Uniform Size," Ind Eng Chem Fundam v2(2): 130-5, University of California, Berkeley, California, May 1963, (6 pages).

https://en.wikipedia.org/wiki/Thermal_energy_storage#Molten_salt_technology.

* cited by examiner

PROCESS AND SYSTEM FOR HOT AND/OR COLD ENERGY TRANSFER, TRANSPORT AND/OR STORAGE

STATEMENT REGARDING FEDERALLY SPONSORED RESEARCH OR DEVELOPMENT

This invention was made with government support under grant DE AR0000464 awarded by the Department of Energy. The government has certain rights in the invention.

BACKGROUND OF THE INVENTION

Field of the Invention

This invention relates generally to thermal conveyance and, more particularly, to a system and process for absorbing, transporting, storing and/or recovery of thermal energy (defined as both hot and cold energy) over a wide range of temperatures, ranging from subzero to as high as 2,100° F. or higher, for heating, cooling and power generation applications.

Discussion of Related Art

A wide range of technologies and materials are available or under development for heat transfer and elevated temperature thermal energy storage and regeneration. However, technologies and materials that effectively operate at temperatures approaching 1100° F. or higher, such as typically required to deliver high energy efficiencies, remain a challenge. Generally, higher temperatures mean fewer options, higher costs, and reduced reliability.

A number of specific approaches have been investigated for thermal energy storage. One approach is to hold heat, such as from generated steam, in a bed of sand or refractory material by incorporating embedded steam pipes and to recover the heat later from the hot bed to generate power. A second approach is to transfer the heat to an organic liquid that is then held in a 'hot' tank until needed to generate steam such as for a turbine. After transferring heat, the organic liquid is pumped to a 'cold' tank in preparation for collecting more heat. Organic liquids in such applications are generally limited to operating temperatures well below 750° F., and suffer from problems with volatilization and degradation reactions.

The concept of mixing solid particles in a gas to increase radiation and conductive/convective heat transfer has been previously explored. For example, in the 1960's Farber and Depew investigated the effect on heat transfer at a solid wall by adding uniformly sized 30 to 200 micron spherical glass particles to a gaseous stream flowing in a tube. Their results indicate a substantial increase in heat transfer coefficient for 30 microns, a moderate increase for 70 microns, a slight increase for 140 microns and essentially no increase for the 200 micron particles. In the late 1970's and early 1980's, Hunt A. J. and colleagues investigated a new high temperature gas receiver using a mixture of ultra-fine carbon particles in a gas stream and exposing the suspension to concentrated sunlight to produce a high temperature fluid for power generation applications (Brayton Cycle). Their analysis showed receiver efficiencies close to 95% would be expected.

There has also been considerable ongoing research on liquids mixed with solid nano particles to create improved heat transfer fluids (primarily for low temperature heat sink applications) and on increasing radiation heat transfer from flames by low level particle seeding.

Except for the receiver, most of the other work on two phase fluids containing gas and solid particles has been limited to relatively low temperatures and/or low levels of loading.

Current state-of-the-art thermal storage is commonly carried out using mixtures of nitrate salt. In currently deployed systems, molten salts are circulated to collect heat and the heated salt is stored in a 'hot' tank. When additional power production is desired, the hot molten salt is used to generate high pressure steam for the turbine. The molten salt is then stored at a lower (but not ambient) temperature in a 'cold' tank. Such a process creates a closed system so no salt make-up is required. The most commonly used salts are saltpeter or mixtures of sodium and potassium nitrates operating at temperatures as high as 1020° F. One of the advantages of molten salt thermal energy storage is that the molten salt does two jobs. Molten salt is pumped through the heat source and collects heat. Then the hot molten salt serves as a heat sink to generate steam at a later time. Molten salts avoid the volatility problems of liquid organic energy storage fluids, and molten salts can work at higher maximum temperatures. This elegance comes with limitations imposed by the properties of the molten salts. The limitations include:

a. The salts must be kept molten. Such nitrate mixtures melt at temperatures >435° F., meaning that all lines and even the 'cold' tank must be insulated and kept at a high enough temperature to prevent freezing or solid deposition in the pipes.

b. Viscosities must be kept low. Over the temperature range of 480-930° F., molten salt mixture viscosities can vary by a factor of 5. This increases pump duty, the cost of pumps, and the electricity needed to pump the molten salts.

c. Side reactions must be avoided. Nitrate salts can react with carbon dioxide and oxygen in the air to produce carbonate and nitride salts that change the molten salt mixture properties. Even more damaging is the formation of nitric acid by reaction with air at high temperatures.

d. Some molten salt mixtures are expensive. Improving molten salt properties by lowering the melting point, lowering viscosity, increasing working temperature range, and raising temperature can be accomplished by adding other salts such as lithium and calcium nitrate to the mixture. These other salts, especially lithium nitrate, are costly and add significant capital cost to the thermal energy storage system.

e. Molten salts are typically corrosive. Materials for tanks and lines must be carefully selected to limit corrosion. Increasing temperature from 480-930° F. can increase corrosion rates by a factor of 4. Compensating for the effects of corrosion adds capital cost.

f. The maximum working temperature is undesirably too low. Molten salt mixtures have a maximum working temperature in the range of 750–1020° F. Above this temperature, they suffer from excessive corrosion rates and high levels of side reactions.

g. Researchers are pursuing the use of single tank nitrate salt storage using tanks with controlled temperature gradients. This approach eliminates one large tank but leads to some increase in size for the single tank and increased complexity and controls.

Metals and eutectic metals have generally been less explored as PCMs as compared to organic compounds and salt hydrates. Metals face serious engineering challenges because of their weight. Metals have low heats of fusion by weight but high heats of fusion by volume. Metals have high thermal conductivities and low vapor pressures in the liquid state. Severe penalties for metals are their high weights and their high costs compared with organic compounds (especially paraffins) and salts. As a result, metals and eutectic metals are generally not seriously considered currently as PCMs.

A third major area of energy storage research being actively pursued is thermochemical storage. The range of possible applications for the purpose of heat storage using thermochemical reactions is very wide, however these systems are expected to be more complex and also dependent on reaction rates. Starting from temperatures of around 160° F. (salt-hydrates and solutions) to typical dissociation processes of hydroxides at around 390-660° F., ammonia dissociation at 750-1290° F., up to around 2000° F. for solar thermal processes in tower plants.

There are different possible mechanisms to store enthalpy, including:

a. Heat of dilution: Adding or removing water to a salt solution;
b. Heat of hydration: Absorbing or removing water molecules in a salt crystal;
c. Heat of solution: Solving and crystallizing a salt; and
d. Heat of reaction (including heat of hydrogenation): fusion and separation of two or more chemical substances.

Transporting, storing and recovering cold is also challenging because of freezing issues with liquids and low heat capacity and heat transfer rates of gases.

SUMMARY OF THE INVENTION

A general objective of the subject development is to provide improved processes and systems for absorbing, transporting, storing, and recovering thermal energy (defined as both hot and cold energy) over a wide range of temperatures, from subzero to as high as 2,100° F. or higher, for heating, cooling, and power generation applications.

A more specific objective of the subject development is to overcome one or more of the problems described above.

In an embodiment of this invention, there is provided a process for absorbing, transporting, storing, and recovering thermal energy involving at least one of:

a. mixing fine particles with a carrier gas to create a two phase thermal media;
b. transferring thermal energy to the two phase thermal media; and
c. storing two phase thermal media for at least a temporary period of time; and
d. recovering the thermal energy from the two phase thermal media.

In one embodiment, a system for operating the process, described above, may include a particle storage hopper that holds the fine particles at a hopper pressure (P4) and a hopper temperature (T1). The fine particles are preferably selected to have suitable characteristics including, but not limited to, suitable service temperature, melting point, thermal characteristics, radiation characteristics, mechanical characteristics, and flow properties. For example, the fine particles may be selected from carbon, plastic, sand, minerals, refractory, metals, composites, glass and other types of materials. In an embodiment of this invention, the fine particles have a mean diameter ranging from 10 microns to 1000 microns. In a preferred embodiment, the fine particles comprise a mean diameter ranging from 50 to 300 micron.

The particle storage hopper preferably connects to a carrier gas source providing a carrier gas at an initial gas pressure (P1) and an initial temperature (T8). The carrier gas is preferably non-reactive with the fine particles and is preferably selected from the group consisting of air, nitrogen, carbon dioxide, inert gases and combinations thereof. The fine particles from the particle storage hopper combine in a pipeline with the carrier gas to create a two phase thermal media at a media temperature (T2). The two phase thermal media provides a thermal energy fluid for absorbing, transporting, storing and recovering thermal energy over a wide range of temperatures from subzero to 2,100° F. or higher for heating, cooling, and power generation applications.

In an embodiment of this invention, the two phase thermal media enters a heat exchanger with a thermal energy source or sink. The two phase thermal media is then heated or cooled to a heat exchanger output temperature (T3) through transfer of thermal energy between the energy source or sink, respectively, and the two phase thermal media.

After the thermal energy transfer completes, the two phase thermal media, now heated or cooled, passes out of the heat exchanger and flows in a pipeline to a second particle storage hopper where the fine particles are separated from the carrier gas and the fine particles are maintained in the second particle storage hopper at a second hopper pressure (P2). In an embodiment of this invention, the carrier gas, separated from the fine particles, may then be provided to a separator/filter to extract any entrained fine particles remaining in the carrier gas.

In an embodiment of this invention, the heated or cooled fine particles may be stored in the second particle storage hopper until the thermal energy needs to be exchanged. The fine particles maintained in the second particle storage hopper may then be transported and/or used as a thermal energy source or sink to heat or cool.

When exchanging the hot or cold thermal energy from the fine particles, the particle storage hopper preferably connects to a second carrier gas source that provides a second carrier gas at an initial gas pressure (P3) and an initial temperature (T7). The second carrier gas is preferably non-reactive with the fine particles and preferably may be selected from the group consisting of air, nitrogen, carbon dioxide, inert gases and combinations thereof. In one embodiment, the second carrier gas may be the same type of gas as the carrier gas, however it may also be another type of carrier fluid. In operation, the fine particles from the second particle storage hopper combine with the second carrier gas to create a second two phase thermal media at a media temperature (T5).

The second two phase thermal media is then provided to a second heat exchanger with a second heat source or sink. The second two phase thermal media is then heated or cooled to a second heat exchanger output temperature (T6) through transfer of thermal energy between the second heat source or sink and the second two phase thermal media. At the same time, the heat source or sink is heated or cooled to a desired temperature.

The system and process of this invention of using a particle laden gas as combined heat transfer and storage media offers a number of benefits over previously known technologies in high temperature thermal transfer and storage applications, including:

a. Allows direct absorption/rejection of radiant energy into/from solid particles when using flow tubes made from materials that are substantially transparent to radiant energy.
b. Provides direct contact heat transfer between particles and carrier fluid to eliminate heat exchange surface and dramatically increase heat transfer rates during both heat (or cold) storage and recovery.

c. Allows use of a loop combining both energy transfer and storage.

d. Availability of a wide range of materials offering performance-costs trade-offs.

e. Very wide range of application temperatures from well below freezing to very high temperatures, without pressure, viscosity or freezing issues common with heat transfer fluids.

f. Potential to achieve temperatures over 2,100° F., limited only by the ability of transport and storage equipment to handle the hot media.

g. Potential to achieve temperatures well below freezing.

h. Direct contact storage and recovery of heat (or cold) for higher efficiencies and fewer exchange surfaces.

i. Costs can be controlled through choice of materials.

j. Advantages over molten salts include less sensitivity of viscosity to temperature, no need to maintain temperatures above melting point to avoid solidification/freezing, no side reactions, noncorrosive, and potential for much higher temperatures.

k. Advantages over thermal oils include more efficient storage, no need to maintain temperatures above a certain limit to maintain flow properties, and ability to create a non-flammable gas-particle mixture and ability to operate at low pressures.

Other objects and advantages will be apparent to those skilled in the art from the following detailed description taken in conjunction with the appended claims and drawings.

BRIEF DESCRIPTION OF THE DRAWINGS

These and other objects and features of this invention will be better understood from the following detailed description taken in conjunction with the drawings, wherein.

DETAILED DESCRIPTION OF THE INVENTION

Figure 1:
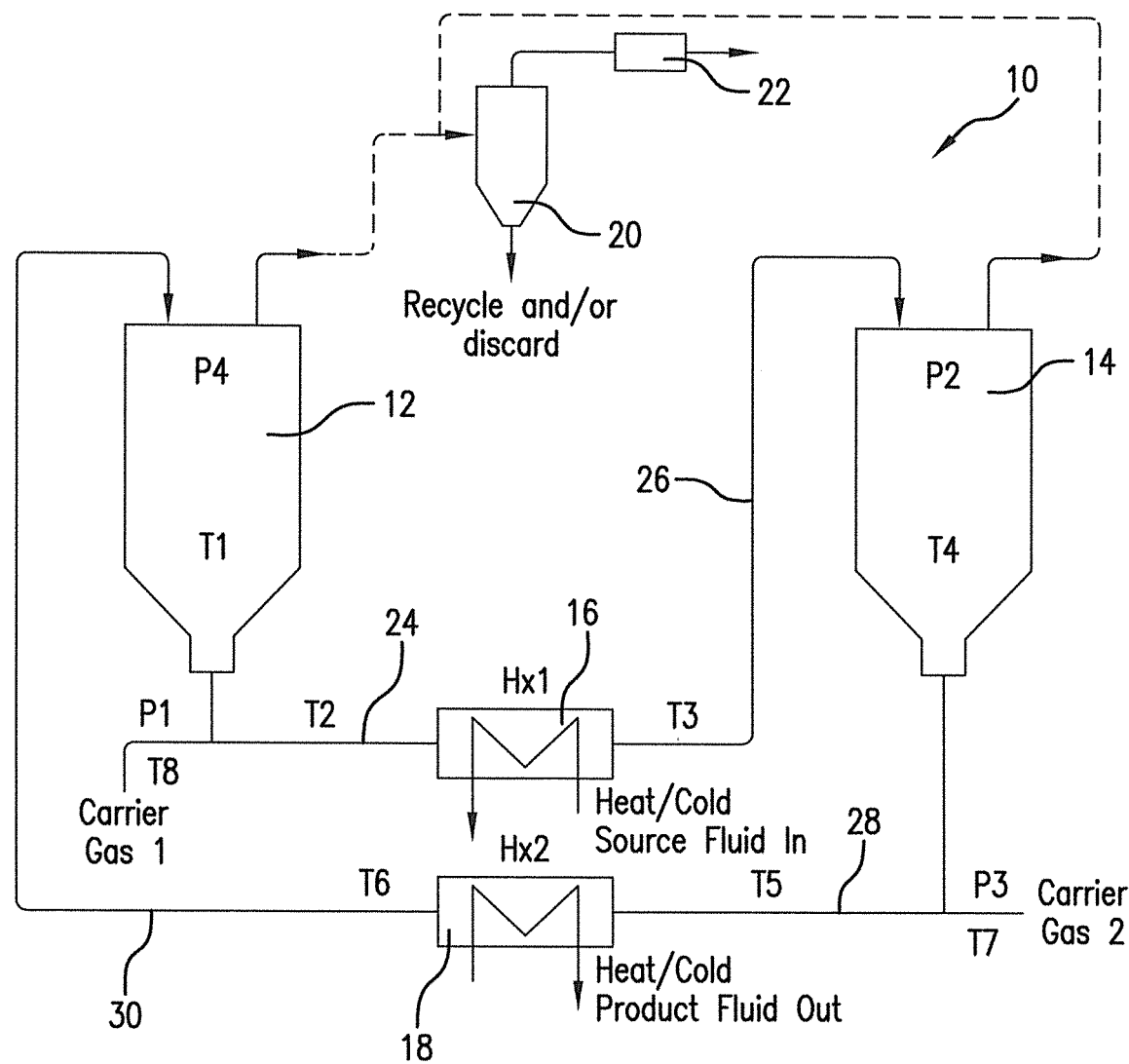
FIG. 1 is a simplified flow diagram illustrating one embodiment of a system for absorbing, transporting, storing and/or recovering thermal energy (defined as both hot and cold energy).

As described in greater detail below, there is provided a system 10 and process for absorbing, transporting, storing and recovering thermal energy (defined as both hot and cold). At a high level, the process involves at least one of transferring thermal energy to a thermal energy fluid, storing the thermal energy for at least a temporary period of time, and/or recovering the thermal energy, wherein the thermal energy fluid comprises a two phase thermal media including a gaseous carrier containing a quantity of micron to millimeter sized solid particles and wherein the temperature varies over a wide range of from subzero to as high as 2,100° F. or higher, for heating, cooling and power generation applications.

In accordance with one aspect of the invention, suitable thermal energy fluids comprise a two phase thermal media having fine particles with suitable characteristics mixed with a gas that is non-reactive to the specific particles or particle mixtures. Compared with gas only heat transfer fluids, the particle laden two phase thermal media of this invention allows for operation over the working temperature of the solid particles and the working temperatures and pressures of the gas while also providing an increase in the specific heat or cold capacity and heat transfer coefficient of the carrying gas.

In accordance with this invention, the fine particles should be selected based on the particle's service temperature, melting point, thermal conductivity, specific heat capacity and absorptivity, and flow and mechanical properties. The fine particles may comprise a single material or a mixture of different materials. The particles may also include phase change materials or encapsulated phase change materials. A wide range of naturally occurring and synthetic solids can be used as particles, depending on their thermal, mechanical and flow properties and specific application for the concept. Examples of suitable materials can include corundum, silicon carbide, alumina, silica sand, carbon, graphite, graphene, talc, iron, iron oxide, minerals, plastic, refractory material, metals, metal oxides, alloys, composites, glass, and combinations thereof. In an embodiment of this invention, the fine particles have a mean diameter ranging from 10 microns to 1000 microns. In a preferred embodiment, the particle size ranges from 50 to 300 micron. However, it should be understood that the concept of this invention can be used with a wide range of particle diameters, ranging from submicron to millimeter, by employing appropriate transport and storage systems.

In accordance with this invention, the carrier gas preferably does not react with the particles at the prevailing temperatures. A wide range of gaseous fluids are useable as the carrier gas. Suitable gaseous carriers can include air, nitrogen, carbon dioxide, inert gases and combinations thereof. In accordance with one embodiment, air is a preferred carrier fluid such as for use in an open loop, for example.

With proper selection of the gas and particles, the two phase thermal media can be used to transfer and store thermal energy from subzero temperatures to at up to 2,100 OF or higher depending on the process needs and hot/cold source availability.

FIG. 1 is a simplified flow diagram illustrating one embodiment of the system 10. In this embodiment, the system 10 includes two particle storage hoppers 12, 14 along with two heat exchangers 16, 18. It should be noted that the system 10 shown in FIG. 1 is an example of the system of this invention. The invention can comprise a wide variety of different arrangements with additional hoppers, filters, valves etc. for continuous or intermittent heat (or cold) storage and continuous or on demand recovery of heat (or cold). Furthermore, the system 10 may also include either a single hopper and/or a single heat exchanger.

In operation, when a heat (or cold) source is available, fine particles held in the first particle storage hopper 12 at a temperature T1 are mixed with a compressed carrier gas at pressure P1 and temperature T8, forming a two phase thermal media at temperature T2. The two phase thermal media flows via a line 24 to the first heat exchanger 16. In the first heat exchanger 16, the two phase thermal media is heated (or cooled) to temperature T3 through transfer of thermal energy between the two phase thermal media and the heat (or cold) source. The two phase thermal media, at temperature T3, then flows via a line 26 to the second particle storage hopper 14 where it is maintained at pressure P2, and the heated (or cooled) fine particles are separated from the carrier gas and disengaged in the hopper 14. In this embodiment, the pressure P2 is lower than the pressure P1. The carrier gas together with any entrained fine particles exits the second particle storage hopper 14 and flows to a separator 20 and/or a filter 22 (cyclone, ceramic filter etc. or combination) to capture the particles for collection and discarding or for recycling back into the flow loop.

When there is a demand for heat (or cold), the fine particles held in the second particle storage hopper 14 at temperature T4 are mixed with a second compressed carrier gas at a pressure P3 and a temperature 1T7, forming a second two phase thermal media, at a temperature T5. The second two phase thermal media then flows through a line 28 to the second heat exchanger 18. In the second heat exchanger 18, the second two phase thermal media is heated (or cooled) to temperature T6 through transfer of thermal energy between the second two phase thermal media and the heat (or cold) product fluid. The cooled (or heated) second two phase thermal media then flows through line 30 back to the first particle storage hopper 12, maintained at pressure P4, where the fine particles are separated from the second carrier gas and disengaged in the first particle storage hopper 12. In this example, pressure P4 is preferably lower than the pressure P3. The carrier gas with entrained fine particles exits the first particle storage hopper 12 and flows to the separator 20 and/or the filter 22 (cyclone, ceramic filter etc. or combination) to capture the particles for discarding or for recycling back into the flow loop.

Figure 2:
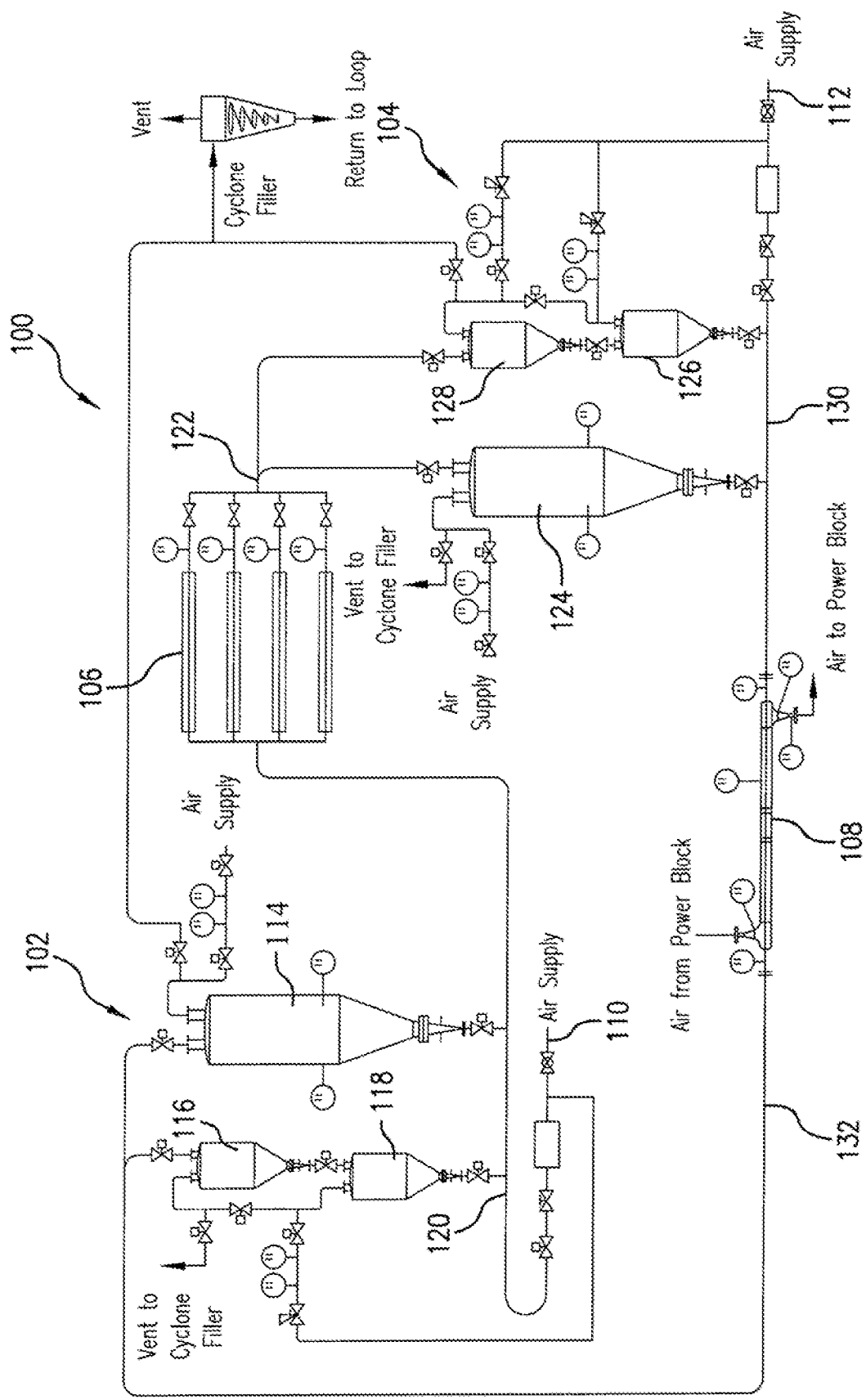
FIG. 2 is a simplified flow diagram illustrating one embodiment of a system for collecting solar energy and using the solar energy to generate hot air.

FIG. 2 is a simplified flow diagram illustrating an embodiment of the invention for collecting solar thermal energy and using it to generate hot air, generally designated by reference number 100. In this example, fine particles can be stored or continuously circulated through the loop as needed. In this embodiment, the system 100 includes a cold particle storage hopper system 102, a hot particle storage hopper system 104, a solar collector bank 106, a heat exchanger 108, a first carrier gas supply 110 and a second carrier gas supply 112. In this embodiment each of the subsystems is connected by a plurality of lines and valves. However, it should be understood, that the invention can comprise a wide variety of different arrangements with additional subsystems, filters, valves etc. for continuous or intermittent heat (or cold) storage and continuous or on demand recovery of heat (or cold).

In the embodiment of FIG. 2, the cold storage hopper system 102 includes a cold storage hopper 114, a cold surge hopper 116 and a cold lock hopper 118. The cold storage hopper 114, the cold surge hopper 116 and the cold lock hopper 118 are preferably connected through a series of lines and/or valves to provide a supply of the fine particles at a desired hopper temperature and/or hopper pressure.

The cold storage hopper system 102 connects to the first gas supply 110 via a line 120, where the fine particles mix with a compressed carrier gas from the first gas supply to form a two phase thermal media at a media temperature and a media pressure.

The two phase thermal media is then provided to the solar collector bank 106. Preferably, the solar collector bank 106 heats the two phase thermal media to a solar collector bank output temperature through transfer of thermal energy from the solar energy source to the two phase thermal media.

In a preferred embodiment, an output line 122 from the heat exchanger allows the two phase thermal media to flow to the hot particle storage hopper system 104 comprising a hot storage hopper 124, a blow tank 126 and a hot lock hopper 128, where the fine particles are separated from the carrier gas. The fine particles are maintained in the second particle storage hopper system 104 at a second hopper temperature and a second hopper pressure.

The heated fine particles are held in the hot particle storage hopper system 104 until needed. The hot storage hopper system 104 connects to the second carrier gas supply 112 via a line 130, where the heated fine particles mix with a compressed carrier gas from the second carrier gas supply to form a second two phase thermal media at a second media temperature and a second media pressure.

The second two phase thermal media is then provided to a system for a desired purpose including heating and/or power generation applications. Alternately, the second two phase media passes to the heat exchanger 108. The heat exchanger includes a product fluid. The second two phase thermal media transfers thermal energy to the product fluid. The heated product fluid is then provided to a system for a desired purpose including heating and/or power generation applications. After serving its desired purpose, the second two phase thermal media then preferably passes through a line 132 and back to the cold particle storage hopper system 102.

The present invention is described in further detail in connection with the following example for recovering heat energy. It is to be understood that all changes that come within the spirit of the invention are desired to be protected and thus the invention is not to be construed as limited by the following example.

In one example, the system 100 can be used with the fine particles stored or continuously circulated through the system as needed. For example, an operating procedure of the system 100 involving 6-hours of storage might include the following steps:

Initial Solids Distribution and Conditions:

Initially, the cold storage hopper 114 is provided with at least a 6-hour supply of the fine particles and pressurized at an initial hopper pressure, and the hot storage hopper 124 is initially empty and depressurized. To begin, the fine particles, at an initial cold temperature, are combined with the first carrier gas forming the two phase thermal media. The two phase thermal media is the provided to the solar collector bank 106 at a flow rate W1. In the solar collector bank 106, the two phase thermal media is heated via thermal energy transfer with the solar energy source. The heated two phase thermal media then flows to the hot storage hopper system 104 at the rate W1, where the heated fine particles are separated from the carrier gas. When needed, the heated fine particles are then combined with the second carrier gas, forming the second two phase thermal media that flows to generators from the blow tank 126 at rate W2, where the rate W2 is less than the rate W1. After transferring thermal energy to the heat sink, the cooled second two phase thermal media preferably flows back to the surge hopper 116 at the rate W2.

For Continuous Operation of Air Heater-Power Block:

This is accomplished using a lock-hopper system. After approximately 30 minutes of operation, the hot lock hopper 128 is filled and valves switch allowing the heated two phase thermal media to flow to the hot storage hopper 124 and the hot lock hopper 128 is pressurized. The solid fine particles are then transferred from the hot lock hopper 128 to the blow tank 126 to maintain a flow of the solid fine particles to the generators. When the hot lock hopper 128 is empty, the hot lock hopper 128 is depressurized, and the valves switch to allow the fine particles to flow back to the hot lock hopper 128 from the hot storage hopper 124.

For Continuous Feed to the Energy Source:

When the surge hopper 116 is filled, the valves are switched to direct the fine particles to the cold lock hopper 118. When the cold lock hopper 118 is full, the cold lock hopper 118 is pressurized, and flow to the energy source is switched from the cold storage hopper 112 to the cold lock hopper 118 and maintained at rate W1. When the cold lock hopper 118 is empty, solids flow W1 is transferred back to the cold storage hopper 112, the cold lock hopper 118 is depressurized, and refilled from the surge hopper 116.

It should be understood that the embodiments described in this application are merely exemplary, a wide range of other configurations of this invention are possible. The invention of this application can be used to transport, store and recover both heat and cold energy from a variety of sources over a wide range of temperatures. Further, the development herein described can, if desired, be used or employed in a continuous heating-cooling configuration such as where both heating and cooling are carried out continuously and simultaneously. Further, the subject development can be used or employed without one of the hot and cold storage vessels or in a closed loop such as using an in line particle-gas mixture pump. Further yet, at least a portion of the carrier gases can be recovered for reuse.

In other embodiments, the invention may include suction pumps on the exhaust of the hoppers to pull the two phase thermal media into the loop. In another embodiment, both pressurized carrier gas and exhaust suction pumps can be employed to promote circulation and flow. In another embodiment, the clean exhaust gas separated from the fine particles, after the cyclone separator and/or filter package, can be recycled back and used as the carrier fluid in a mostly closed loop arrangement. In another embodiment, a portion of the carrier gas may be injected into at least one of the hoppers, at least intermittently, to promote particle fluidization and mixing of stored particles.

It is to be understood and appreciated that transport and/or storage systems employed in the practice of the processing herein described can be operated under pressure or under vacuum, as may be desired for particular applications.

It is to be understood and appreciated that the heat transfer between the particle-gas mixture and the heat or cold source or sink could be by various means, including radiation or direct contact between particles and the heat or cold source or sink.

It is to be understood and appreciated that the broader practice of the subject development is not necessarily limited to use or practice with specific or particular separators or separation techniques or, correspondingly, specific or particular mixers or mixing techniques, relative to the heat transfer fluids herein described. For example, a wide range of devices or techniques can be used to separate particles from gas (e.g. cyclone separator, ceramic cartridge filters, baghouse, etc.) and to feed particles into the carrier fluid (e.g. rotary valve, venturi mixer, etc.). These and other techniques and devices are well known, established and/or commonly practiced such as in the petrochemical, coal combustion and other industries, for example.

It is to be further understood and appreciated that features or components such as the filtering and/or feeding component(s) can suitably be incorporated and, if desired, integrated such as with or in a storage vessel or built into a separate housing and connected to the vessel, such as may be desired for particular applications.

The subject development is suitably applicable to dilute and dense phase transport of particle-gas mixture. In one embodiment, a preferred approach is to use or employ a dense phase transport, e.g., a dense phase loading of the micron to millimeter sized solid particles, to maximize heat transfer rates and minimize transport velocity, particle attrition and transport component erosion.

If desired, suitable flow loop designs can incorporate single or multiple branches separating and combining as appropriate, and one or more storage vessels can be used for either or both cold and hot storage of particles.

In accordance with this invention, the heat and/or cold energy source and/or sink may comprise a single source or multiple sources.

While not required in the broader practice of the developments herein described, in particular applications, the incorporation and use of thermally insulated transport and storage components may be preferred to reduce or minimize thermal losses, for example, hot media becoming cooler during transport and/or storage or cold media becoming warmer during transport and/or storage.

The concept of this invention is applicable to a wide range of processes that have excess heat or cold energy that can be captured and used at a different location and/or a different time. It allows the storage and on-demand use of cold and heat energy. Examples of hot energy sources are solar energy, thermal energy in the exhaust gases of continuous and batch type industrial furnaces, exhaust gases of fired equipment and energy in flares, but the concept can capture and transport as well as store and recover cold and heat energy from a wide range of sources. Examples of cold energy sources are ice, nighttime cooler air and chilled water.

The invention illustratively disclosed herein suitably may be practiced in the absence of any element, part, step, component, or ingredient which is not specifically disclosed herein.

The claims are not intended to include, and should not be interpreted to include, means-plus- or step-plus-function limitations, unless such a limitation is explicitly recited in a given claim using the phrase(s) "means for" or "step for," respectively.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A system for thermal energy transfer and storage, the system comprising:
 a particle storage hopper system maintaining particles at a hopper pressure (P4) and a hopper temperature (T1), the particle storage hopper system comprising a particle storage hopper, a particle surge hopper and a particle lock hopper, wherein the particle storage hopper is disposed in a parallel line configuration with respect to, and separated by valves from, the particle surge hopper and the particle lock hopper, the particle storage hopper system includes particles and wherein when the particle storage hopper is filled with particles, the valves switch to flow particles to the particle surge hopper and the particle lock hopper is pressurized to maintain the particles at the hopper pressure (P4) and the hopper temperature (T1);
 a carrier gas source external the particle storage hopper system, the carrier gas source providing a carrier gas at a particle outlet of the particle storage hopper system and from a location external to the particle storage hopper system, the carrier gas at an initial gas pressure (P1) and an initial temperature (T8), wherein the particles from the particle storage hopper system combine with the carrier gas to create a two phase thermal media at a media temperature (T2);

a heat exchanger including one of a heat source or a heat sink, wherein the two phase thermal media is provided to the heat exchanger where the two phase thermal media is heated or cooled to a heat exchanger output temperature (T3) through a transfer of thermal energy between the heat source or the heat sink and the two phase thermal media; and a second particle storage hopper system, wherein an output stream of the two phase thermal media from the heat exchanger flows to the second particle storage hopper system where the particles are separated from the carrier gas and the particles are maintained in the second particle storage hopper system at a second hopper temperature (T4) and a second hopper pressure (P2).

2. The system of claim 1 wherein the carrier gas separated from the particles is provided to a separator/filter to extract entrained particles.

3. The system of claim 1, further comprising:
a second carrier gas source external the second particle storage hopper system, the second carrier gas source providing a second carrier gas at a particle outlet of the second particle storage hopper system, the second carrier gas at an initial gas pressure (P3) and an initial temperature (T7), wherein the particles from the second particle storage hopper system combine with the second carrier gas to create a second two phase thermal media at a media temperature (T5); and
a second heat exchanger including one of a second heat source or a second heat sink, wherein the second two phase thermal media is provided to the second heat exchanger where the second two phase thermal media is one of heated or cooled to a second heat exchanger output temperature (T6) through transfer of thermal energy between one of the second heat source or the second heat sink and the second two phase thermal media.

4. The system of claim 1 wherein the thermal energy transfer ranges in temperature from 0° F. to 2100° F.

5. The system of claim 1 wherein the particles comprise a mean diameter ranging from 10 microns to 1000 microns.

6. The system of claim 5 wherein the particles comprise at least one of corundum, silicon, carbide, alumina, silica sand, carbon, graphite, graphene, talc, iron, metal, alloy, mineral, refractory, glass and plastic.

7. The system of claim 1 wherein the particles comprise a mean diameter ranging from 50 to 300 micron.

8. The system of claim 1 wherein the carrier gas is non-reactive with the particles and is selected from the group consisting of air, nitrogen, carbon dioxide, inert gases and combinations thereof.

9. The system of claim 1 further comprising:
the second particle storage hopper system comprising a second particle storage hopper a second particle surge hopper and a second particle lock hopper, wherein the second particle storage hopper is disposed in a parallel line configuration with respect to, and separated by valves of the second particle storage hopper system from, the second particle surge hopper and the second particle lock hopper, wherein when the second particle storage hopper is filled with particles, the valves of the second particle storage hopper system switch to flow particles to the second particle surge hopper and the second particle lock hopper is pressurized;
a second carrier gas source external the second particle storage hopper system, the second carrier gas source providing a second carrier gas at a second particle outlet of the second particle storage hopper system and from a second location external to the second particle storage hopper system, the second carrier gas at a second gas pressure and a second temperature, wherein particles from the second particle storage hopper system combine with the second carrier gas to create a second two phase thermal media at a second media temperature; and
a second heat exchanger, wherein the second two phase thermal media is provided to the second heat exchanger where the second two phase thermal media is heated or cooled to a second heat exchanger output temperature through a second transfer of thermal energy;
wherein the particles travel through a particle flow loop connecting the particle storage hopper system to the heat exchanger, the heat exchanger to the second particle storage hopper system, the second particle storage hopper system to the second heat exchanger, and the second heat exchanger to the particle storage hopper system.

10. The system of claim 1 wherein the carrier gas source further provides the carrier gas at a particle outlet of each of the particle storage hopper and the particle lock hopper, and from a location external to the particle storage hopper and the particle lock hopper.

11. The system of claim 1 wherein a particle flow loop connects the particle storage hopper system, the heat exchanger, and the second particle storage hopper system.

12. The system of claim 1 wherein an output particle stream from the second particle storage hopper system returns via a second carrier gas source to the particle storage hopper system.

13. The system of claim 1 wherein a hopper combination of the particle lock hopper and the particle surge hopper is separated from the particle storage hopper by at least one valve at each of an upstream end and a downstream end of the hopper combination.

14. A system for collecting solar energy and using the solar energy to generate hot fluid, the system comprising:
a first particle storage hopper system comprising a cold storage hopper, a cold surge hopper and a cold lock hopper, wherein the cold storage hopper is disposed in a parallel line configuration with respect to, and separated by valves from, the cold surge hopper and the cold lock hopper, the particle storage hopper system includes particles and wherein when the cold storage hopper is filled with particles, the valves switch to flow particles to the cold surge hopper and the cold lock hopper is pressurized to maintain the particles at a hopper pressure (P4) and a hopper temperature (T1);
a carrier gas source external the first particle storage hopper system, the carrier gas source providing a carrier gas at a particle outlet of the particle storage hopper system and from a location external to the particle storage hopper system, the carrier gas at an initial gas pressure (P1) and an initial temperature (T8), wherein the particles from the first particle storage hopper system combine with the carrier gas to create a two phase thermal media at a media temperature (T2);
a heat exchanger comprising a solar collector bank, wherein the two phase thermal media is provided to the solar collector bank where the two phase thermal media is heated to an output temperature (T3) through transfer of thermal energy between a solar energy source and the two phase thermal media; and
a second particle storage hopper system, wherein an output of the two phase thermal media from the heat exchanger flows to the second particle storage hopper system, where the particles are separated from the carrier gas and the particles are maintained in the second particle storage hopper system at a second hopper temperature (T4) and a second hopper pressure (P2).

15. The system of claim 14 wherein the second particle storage hopper system comprises a hot storage hopper, a blow tank and a hot lock hopper.

16. The system of claim 15, further comprising:
a second carrier gas source, the second carrier gas source external the second particle storage hopper system and providing a second carrier gas at a particle outlet of the second particle storage hopper system, the second carrier gas at an initial gas pressure (P3) and an initial temperature (T7), wherein the particles from the second particle storage hopper system combine with the second carrier gas to create a second two phase thermal media at a media temperature (T5); and
a second heat exchanger including one of a heat source or a heat sink, wherein the second two phase thermal media is provided to the second heat exchanger where the second two phase thermal media exchanges thermal energy with the heat source or the heat sink;
wherein a particle flow loop connects the first particle storage hopper system, the heat exchanger, the second particle storage hopper system, and the second heat exchanger.

17. The system of claim 14 wherein the particles comprise a mean diameter ranging from 10 microns to 1000 microns.

18. A process for at least one of absorbing, transporting, storing and recovering thermal energy, the process comprising:
providing a first particle storage hopper system containing a quantity of particles, the first particle storage hopper system including a particle storage hopper, a particle surge hopper and a particle lock hopper, wherein the particle storage hopper is disposed in a parallel line configuration with respect to, and separated by valves from, the particle surge hopper and the particle lock hopper, wherein when the particle storage hopper is filled with particles, the valves switch to flow particles to the particle surge hopper and the particle lock hopper is pressurized;
providing a carrier gas source external the particle lock hopper and the particle storage hopper;
providing a carrier gas from the carrier gas source at a particle outlet of the particle lock hopper and the particle storage hopper and from a location external to the particle lock hopper and the particle storage hopper, whereby particles from the particle lock hopper and the particle storage hopper alternatively combine and mix with the carrier gas to create a two phase thermal media;
transferring thermal energy to or from the two phase thermal media, wherein the thermal energy ranges in temperature from 0° F. to 2100° F.;
providing a second particle storage hopper system to receive the particles from the two phase thermal media after the transferring; and
moving the particles from the second particle storage hopper system to the first particle storage hopper system.

19. The process of claim 18 wherein the particles comprise a mean diameter ranging from 10 microns to 1000 microns, and the particles comprise at least one of corundum, silicon, carbide, alumina, silica sand, carbon, graphite, graphene, talc, iron, metal, alloy, mineral, refractory, glass and plastic.

20. The process of claim 18 wherein the particles comprise a mean diameter ranging from 50 to 300 micron.

* * * * *